R. W. SELLEW.
BALL BEARING.
APPLICATION FILED OCT. 19, 1920.
1,418,888.
Patented June 6, 1922.
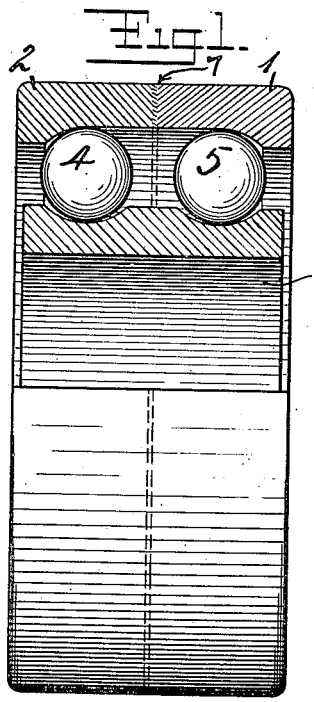
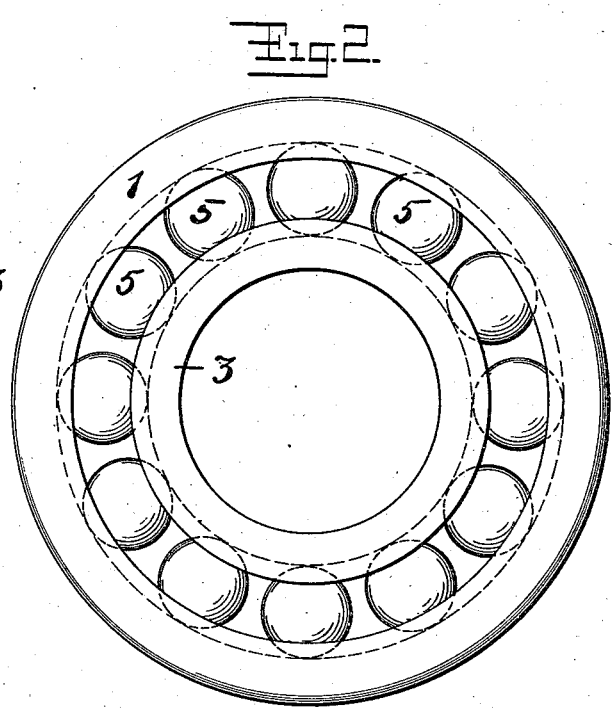
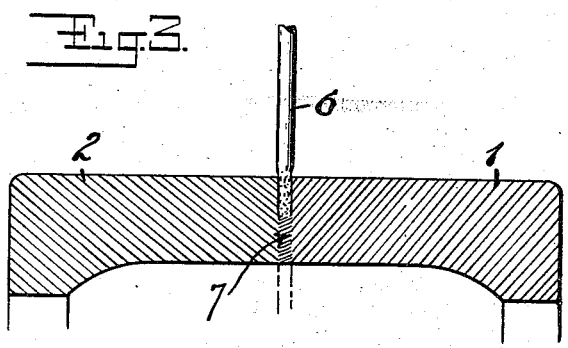
Inventor
R. W. Sellew
By his Attorneys

UNITED STATES PATENT OFFICE.

ROLAND WINCHESTER SELLEW, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL BEARING.

1,418,888.      Specification of Letters Patent.      Patented June 6, 1922.

Application filed October 19, 1920. Serial No. 417,948.

*To all whom it may concern:*

Be it known that I, ROLAND W. SELLEW, a citizen of the United States of America, residing at New Britain, Hartford County, Connecticut, have invented a new and useful Ball Bearing, of which the following is a specification.

My invention relates to a ball bearing. The invention is particularly adapted to double row ball bearings, but is of course not limited thereto.

The preferred method of making the bearing is as follows. Inner and outer bearing rings are provided with complementary raceways therein and one of the rings is made in two parts or sections. After the balls are assembled between the bearing rings, the two parts of the two section ring are brought together to hold the balls between them with the desired degree of pressure and to bring the adjacent edges of the sections in proximity to each other. A fusible electrode is then applied near the adjacent edges of the sections and a current passed through the electrode and one or both of the sections whereby the electrode will be fused and the fused metal will form a weld to connect the two sections together. The sections and electrode may be rotated relatively to each other to weld the sections together entirely around their peripheries.

In the drawings, which show a preferred form of my invention:—

Fig. 1 is an edge elevation of a bearing, parts being shown in section.

Fig. 2 is a side elevation thereof.

Fig. 3 is an enlarged fragmentary partially diagrammatic view showing sections of a ring as they would appear when being welded together.

One of the rings, preferably the outer, is made in two ring like sections 1—2. 3 indicates the inner ring. 4—5 indicate the balls of two separate series which run in complementary race-ways in the inner and outer rings.

In assembling the bearing the edges of the sectional ring are separated and the balls assembled between the rings. The sections are next brought toward each other until the desired pressure between the balls and rings is attained and the adjacent edges of the sections will be in proximity to each other. In the drawings, the distance between the edges of the sections is slightly exaggerated for the sake of clearness, but it should be understood that if desired, the sections may meet, or be very close together.

When the sections have been forced toward each other with the desired pressure, a fusible electrode 6 is applied near the adjacent edges of the sections and a current passed through the electrode and the sections. Upon the passage of the current the fusible electrode will be fused and the fused metal will weld the sections together as indicated at 7. If it is desired to weld the edges of said sections together about their entire peripheries, the sections and the electrode will be rotated relatively to each other.

It will be obvious that the completed bearing ring will, in effect, be two sections connected together by a separate strip forming a weld. I do not wish to be limited to the specific means of welding a separate strip between the two separate sections.

What I claim is:

1. In a double row ball bearing, an inner ring having two separated ball races on the outer side thereof, an outer ring having two separated ball races on the inner side thereof complementary to the races on the first mentioned ring, one of said rings being formed of two sections, each section having one of said ball races thereon, said sections being integrally united by a strip of material welded thereto between the adjacent edges thereof.

2. In a double row ball bearing, an inner ring having two separated ball races on the outer side thereof, an outer ring having two separated ball races on the inner side thereof complementary to the races on the first mentioned ring, the outer of said rings being formed of two sections, each section having one of said ball races thereon, said sections being integrally united by a strip of material welded thereto between the adjacent edges thereof.

3. A ball bearing comprising an inner and an outer ring having complementary race ways, balls therebetween, the outer ring being formed of two sections corresponding substantially in shape, the adjacent edges of said sections being integrally united by a strip of metal welded thereto.

ROLAND WINCHESTER SELLEW.